United States Patent [19]
Griffin, Jr. et al.

[11] Patent Number: 5,472,633
[45] Date of Patent: Dec. 5, 1995

[54] PROCESS FOR THE PREPARATION OF A STABLE SALT-FREE IRON CHELATE FOR USE IN HYDROGEN SULFIDE ABATEMENT

[75] Inventors: Freddie Griffin, Jr., Missouri City; David A. Wilson, Richwood, both of Tex.; Steven H. Christiansen, Waianae, Hi.

[73] Assignee: The Dow Chemical Company, Midland, Mich.

[21] Appl. No.: 957,320

[22] Filed: Oct. 6, 1992

[51] Int. Cl.$^6$ .............................. C09K 3/32; C01B 21/06; C01B 17/02; B01J 20/00
[52] U.S. Cl. ........................ 252/189; 252/191; 252/184; 423/576.6
[58] Field of Search ................................ 252/184, 185, 252/189, 191; 423/576.6

[56] References Cited

U.S. PATENT DOCUMENTS

| | | | |
|---|---|---|---|
| 3,767,689 | 10/1973 | Donovan et al. | 260/439 R |
| 4,400,368 | 8/1983 | Diaz | 423/573 R |
| 4,414,817 | 11/1983 | Jernigan | 60/641.2 |
| 4,438,040 | 3/1984 | Svatck et al. | 260/439 R |
| 4,468,929 | 9/1984 | Jernigan | 60/641.2 |
| 4,518,576 | 5/1985 | Diaz | 423/573 R |
| 4,528,817 | 7/1985 | Jernigan | 60/641.2 |
| 4,756,836 | 7/1988 | Jeffrey et al. | 210/750 |
| 4,816,238 | 3/1989 | Jeffrey | 423/226 |
| 4,871,468 | 10/1989 | Jeffrey | 252/190 |
| 5,110,965 | 5/1992 | Thunberg et al. | 556/148 |
| 5,149,460 | 9/1992 | Olson et al. | 252/191 |

*Primary Examiner*—Gary L. Geist
*Assistant Examiner*—Joseph D. Anthony
*Attorney, Agent, or Firm*—Karen L. Kimble

[57] ABSTRACT

A stable, salt-free iron chelate for use in aqueous alkaline systems is prepared by contacting iron oxide with an aqueous mixture of from 30 to 45 mole percent trisodium HEDTA and from 55 to 70 mole percent EDTA, heating the mixture to dissolve the iron, and adjusting the pH to from 7 to 10 with base.

4 Claims, No Drawings

PROCESS FOR THE PREPARATION OF A STABLE SALT-FREE IRON CHELATE FOR USE IN HYDROGEN SULFIDE ABATEMENT

FILED OF THE INVENTION

The present invention concerns the preparation of an iron chelate useful for removing hydrogen sulfide from fluid streams. More particularly, the present invention concerns a process for the preparation of a stable, salt-free iron chelate for alkaline systems from iron oxide and a mixture of ethylenediaminetetraacetic acid (EDTA) and the trisodium salt of hydroxyethylethylenediaminetriacetic acid (HEDTA).

BACKGROUND OF THE INVENTION

The use of polyvalent metal chelates in general and of iron chelates in particular is well known for the removal of $H_2S$ from sour gas or liquid streams. For example, R. T. Jernigan in U.S. Pat. Nos. 4,414,817, 4,468,929 and 4,528,817 discloses the treatment of geothermal steam by condensing it with an aqueous solution of a ferric chelate such as that of hydroxyethylethylenediaminetriacetic acid (HEDTA) or ethylenediaminetetraacetic acid (EDTA). The hydrogen sulfide is converted to elemental sulfur and the ferric chelate is reduced to ferrous oxidation state. The ferrous chelate is subsequently oxidized back to the ferric oxidation state and recycled. Z. Diaz in U.S. Pat. Nos. 4,400,368 and 4,518,576 discloses similar processes for treating sour gas streams, while Jeffrey et al., further expand such applications to drilling fluids and muds in U.S. Pat. No. 4,756,836.

More recently, U.S. Pat. No. 4,816,238 calls for the preferred treatment of sour gases containing $H_2S$ with aqueous alkaline solutions of polyvalent metal chelates at a pH of about 7 to 10. The ferric complex of HEDTA is much more stable than that of EDTA at pH values above 8. Under these conditions, the ferric complex of HEDTA is usually required to assure that the iron remains in solution or does not react with sulfide to form FeS.

Aminopolycarboxylic acids such as HEDTA and EDTA are commercially produced as the sodium salts. If the acid form is desired, further processing is necessary. To prepare EDTA acid, about a 40 weight percent aqueous solution of tetrasodium EDTA is pH adjusted to about 2.2 with mineral acid. Since EDTA is relatively insoluble in water, it is readily obtained by simple filtration of the precipitate. The HEDTA acid, on the other hand, remains soluble in water under acid conditions and is very difficult to isolate. As a result, HEDTA acid is not readily available on a commercial scale.

Aqueous solutions of iron chelates of aminopolycarboxylic acids are conveniently prepared using iron oxide ($Fe_3O_4$) and the aminopolycarboxylic acid; see U.S. Pat. Nos. 3,767,689 and 4,438,040. With only the trisodium salt of HEDTA being readily available, however, only water soluble iron salts are suitable as the source of iron. Typically, ferric HEDTA is prepared using iron nitrate and an aqueous solution of trisodium HEDTA. Like many other nitrate containing mixtures, however, the resulting chelate prepared from iron nitrate may be thermally unstable. Furthermore, neither the iron halides nor iron sulfate are preferred ever iron nitrate because of inherent problems associated with their counterions. The halides from the iron halides cause unacceptable corrosion problems while the sulfate from iron sulfate exhibits stability problems in concentrated solutions where sodium sulfate decahydrate is prone to precipitate. Thus, it is highly desirable to have a stable aqueous iron chelate for use in $H_2S$ abatement in alkaline systems and to have a convenient method to manufacture such a chelate.

SUMMARY OF THE INVENTION

The present invention concerns a process for making an aqueous solution of a stable salt-free iron chelate containing a mixture of EDTA and HEDTA which comprises contacting iron oxide with an aqueous mixture of aminopolycarboxylic acids which comprises from 30 to 45 mole percent of the trisodium salt of HEDTA and from 55 to 70 mole percent of EDTA, heating the mixture to dissolve the iron, and adjusting the pH to from 7 to 10. Thus, the present invention provides a method for manufacturing a stable, salt-free iron chelate for use in aqueous alkaline systems from readily available starting materials.

The present invention also concerns an aqueous solution of a stable, salt-free iron chelate containing a mixture of ethylenediaminetetraacetic acid (EDTA) and hydroxyethylethylenediaminetriacetic acid (HEDTA), which comprises from 30 to 45 mole percent of the trisodium salt of HEDTA and from 55 to 70 mole percent EDTA, whenever the aqueous chelate solution is prepared by the process of claim 1, for use in the abatement of hydrogen sulfide in aqueous alkaline systems.

DETAILED DESCRIPTION OF THE INVENTION

The starting materials required for the practice of this invention are well known and commercially available.

Iron oxide, as used herein, refers to $Fe_3O_4$ which is also known as ferrosoferric oxide or ferric ferrous oxide. It occurs in nature as the mineral magnetite and, while practically insoluble in water, it is soluble in acids.

Ethylenediaminetetraacetic acid (EDTA) is commercially available as a solid or can be conveniently prepared as a slurry by the addition of mineral acid to an aqueous solution of tetrasodium EDTA.

Hydroxyethylethylenediaminetriacetic acid (HEDTA) is commercially available as the trisodium salt which is often provided as a 41 percent aqueous solution. This solution is conveniently used directly in the present process.

In the present process, the iron oxide is contacted with an aqueous mixture of EDTA and trisodium HEDTA. In order to ensure alkaline stability, a larger proportion of trisodium HEDTA is desirable. However, in order to ensure complete dissolution of iron oxide, a larger proportion of EDTA free acid is desirable. By keeping the mole ratio of EDTA/HEDTA from 70/30 to 55/45, both solubility and alkaline stability can be achieved. The preferred ratio of EDTA/HEDTA is generally in the range of from 65/35 to 55/45.

Although only a stoichiometric amount of the aminopolycarboxylic acids is required for each equivalent of iron, it is often convenient to employ an excess of the mixture of EDTA/HEDTA during the preparation of the chelate. While mole ratios of total aminopolycarboxylic acid to iron of up to 2 or more can be employed, the use of a large excess of aminopolycarboxylic acids is inefficient. For this reason, molar ratios of total aminopolycarboxylic acids to iron of from 1 to 1.5 are preferred; ratios of from 1.05 to 1.2 are most preferred. Thus, each mole of iron from iron oxide is contacted with from 1 to 1.5 moles, and, more preferably, with from 1.05 to 1.2 moles of aminopolycarboxylic acids comprising a mixture of EDTA/HEDTA in a ratio of from 70/30 to 55/45.

For applications in hydrogen sulfide abatement, it is convenient to provide concentrated chelate solutions in which the iron content is from about 1 to about 7 percent by weight, most preferably from about 2.5 to 5 percent iron. When used for hydrogen sulfide abatement, the the concentrated solution is diluted, preferably at the site.

Once the iron oxide is contacted with the aqueous mixture of aminopolycarboxylic acids, the dissolution of the iron and formation of the chelate is facilitated by heating the mixture. While the exact temperature is not critical, temperatures in the range of from 85° to about 100° C. are usually employed. It is often most convenient to heat the mixture at reflux.

After the iron has been completely dissolved, the pH of the solution is adjusted to from 7 to 10. Any base which does not adversely affect the stability of the chelate solution can be used. Suitable bases include caustic or ammonia. Furthermore, once the iron has been dissolved, the pH can be adjusted with additional amounts of trisodium HEDTA, even though the total proportion of HEDTA in the final composition exceeds the limits prescribed in the first step of the process.

The following examples illustrate the present invention and should not be construed as limiting the scope of the invention.

EXAMPLE 1

To a round-bottom reaction flask equipped with a stirrer, thermometer, heating mantle, temperature controller, reflux condenser, and pH probe were added 87.7 grams (g) (0.3 mole) of ethylenediaminetetraacetic acid (EDTA) and 80 milliliters (ml) of deionized water. This slurry was stirred and 0.2 mole (166.7 g) of a 41 percent aqueous solution of the trisodium salt of hydroxyethylethylenediaminetriacetic acid (HEDTA) were added. The reaction mixture was heated to a temperature of 50° C. and 34.2 g of $Fe_3O_4$ (70 percent Fe–0.44 mole Fe) were added with stirring. The reaction mixture was then heated to reflux and stirred for approximately 1 hour (hr). An additional 150 ml of deionized water was added and the mixture heated for 1.5 hr to achieve dissolution of the iron oxide and then cooled to about 50° C. The pH was adjusted from approximately 5.5 to about 7.5 with aqueous ammonia (28 percent). Deionized water was added to obtain a final concentration of 4.5 percent iron. No insoluble iron oxide was present. The EDTA/HEDTA molar ratio for this product is 60:40.

EXAMPLE 2

To a round-bottom reaction flask equipped with a stirrer, thermometer, heating mantle, temperature controller, reflux condenser, and pH probe were added 80.4 g (0.275 mole) of EDTA and 75 ml of deionized water. This slurry was mixed and 0.225 mole (188.9 g) of a 41 percent aqueous solution of the trisodium salt of HEDTA was added. The reaction mixture was heated to a temperature of 50° C. and 34.2 g of $Fe_3O_4$ (70 percent Fe–0.44 mole Fe) were added with stirring. The reaction mixture was then heated to reflux and stirred for approximately 1 hr. An additional 150 ml of deionized water was added and the mixture heated for 1.5 hr to achieve dissolution of the iron oxide and then cooled to about 50° C. The pH was adjusted from approximately 6.6 to about 7.4 with aqueous ammonia (28 percent). Deionized water was added to obtain a final concentration of 4.5 percent iron. No insoluble iron oxide was present. The EDTA/HEDTA molar ratio for this product is 55:45.

EXAMPLE 3

To a round-bottom flask equipped with a stirrer, thermometer, heating mantle, temperature controller, reflux condenser, and pH probe was added 219.3 g (0.75 mole) of EDTA and 182 g of deionized water. While stirring, 416.7 g (0.5 mole) of a 41 percent aqueous solution of the trisodium salt of HEDTA were added. The reaction mixture was heated to a temperature of about 65° C. and 85.0 g of $Fe_3O_4$ (1.1 mole of Fe) and 110 ml of deionized water were added. The mixture was heated at reflux for 2 hr at which time 100 ml of deionized water was added. Heating was continued for 3 hr and then the reaction mixture was cooled to approximately 25° C. The pH of the solution was 5.3. The pH was adjusted to 7.0 by the addition of 292.1 g of a 41 percent aqueous solution of the trisodium salt of HEDTA. Deionized water was added to achieve a final iron concentration of 4.3 percent.

EXAMPLE 4

To a mixture of 306 pounds (lbs) (139 kg) of a 54 percent aqueous slurry of EDTA and of 315 lbs (143 kg) of a 41 percent solution of the trisodium salt of HEDTA is added 69 lbs of $Fe_3O_4$. The mixture is heated at reflux until all of the iron dissolved. After cooling, the mixture is neutralized with 5 lbs (2.3 kg) of ammonia and further diluted with 305 lbs (139 kg) of water to produce a chelate solution having about 5 weight percent iron and an EDTA/HEDTA molar ratio of 60/40.

EXAMPLE 5

An EDTA/HEDTA chelate solution having a molar ratio of 60/40, prepared as in Example 1, was diluted to approximately 2500 ml with deionized water and placed in a four liter resin kettle equipped with a stirrer, thermometer, heating mantle, temperature controller, gas lines, caustic scrubber lines, pump, and sulfur filter, and allowed to equilibrate. The pH was 8.0. The temperature was maintained at 120° C. The gas monitor was engaged and lead acetate tape placed around the flask joints and gas fittings. Air at 500 standard cubic feet per minute (scfm) was sparged into the bottom of the flask through a 7μ stainless steel frit using ¼ stainless steel tubing. The air sparging was done for 30 minutes to assure there was little ferrous iron present. After the sparging was completed, 100 scfm of a mixture of $H_2S$ and $N_2$ gases were introduced for 10 minutes to the reaction mixture through the 7μ sparge frit. After the addition of the gas mixture, some sulfur particles were noted forming on the surface of the reaction mixture. No breakthrough of the $H_2S$ gas was determined at the 10 ppm level by the monitor and no darkening of the lead acetate paper was observed. The gas was shut off and the sulfur filtered from the solution. The chelate solution remained a dark red brown and showed no pea green color change (which is indicative of sufficient Fe(III) being present to achieve oxidation of the $H_2S$). Liquid chromatography showed little or no degradation of the solution. The chelate appeared to remain intact.

What is claimed is:

1. A process for the preparation of an aqueous solution of a stable, salt-free iron chelate containing a mixture of ethylenediaminetetraacetic acid (EDTA) and hydroxyethylethylenediaminetriacetic acid (HEDTA) which comprises contacting and reacting iron oxide with an aqueous mixture of aminopolycarboxylic acids which comprises from 30 to 45 mole percent of the trisodium salt of HEDTA and from 55 to 70 mole percent EDTA, wherein each mole of iron from iron oxide is contacted with from 1 to 1.5 moles of the total of EDTA and HEDTA, heating the mixture from about 85° to about 100° C. to dissolve the iron, and adjusting the pH to from 7 to 10.

2. The process of claim 1 wherein each mole of iron from iron oxide is contacted with from 1.05 to 1.2 moles of the total of EDTA and HEDTA.

3. The process of claim 1 wherein the molar ratio of EDTA/HEDTA is 60:40 and the solution is diluted with water to achieve a weight percent iron of 4.5.

4. The process of claim 1 wherein the molar ratio of EDTA/HEDTA is 55:45 and the solution is diluted with water to achieve a weight percent iron of 4.5.

* * * * *